US009226473B2

(12) United States Patent
Hoffman (10) Patent No.: US 9,226,473 B2
(45) Date of Patent: Jan. 5, 2016

(54) VEHICLE PET SAFETY ENCLOSURE AND PORTABLE KENNEL

(71) Applicant: Jonathan Hoffman, Malibu, CA (US)

(72) Inventor: Jonathan Hoffman, Malibu, CA (US)

( * ) Notice: Subject to any disclaimer, the term of this patent is extended or adjusted under 35 U.S.C. 154(b) by 109 days.

(21) Appl. No.: 14/051,445

(22) Filed: Oct. 11, 2013

(65) Prior Publication Data

US 2014/0102377 A1    Apr. 17, 2014

Related U.S. Application Data

(60) Provisional application No. 61/795,326, filed on Oct. 15, 2012.

(51) Int. Cl.
*A01K 1/03* (2006.01)
*A01K 1/00* (2006.01)
*A01K 1/02* (2006.01)

(52) U.S. Cl.
CPC ............. *A01K 1/0035* (2013.01); *A01K 1/0272* (2013.01)

(58) Field of Classification Search
CPC . A01K 1/0236; A01K 1/0245; A01K 1/0272; B60R 22/10
USPC .......... 119/496, 497, 498, 499, 771; 135/124–125, 136, 161, 119, 96; 296/24.31; 280/801.1, 748, 751; 297/216.11, 250.1, 256.15
See application file for complete search history.

(56) References Cited

U.S. PATENT DOCUMENTS

| 2,811,977 | A | * | 11/1957 | McClish ................... 297/184.14 |
| 2,830,606 | A | * | 4/1958 | Daugherty ..................... 52/2.19 |
| 2,909,154 | A | * | 10/1959 | Thomas ............... A01K 27/003 119/771 |
| 3,148,662 | A | * | 9/1964 | Morrell ........................... 52/2.17 |
| 3,156,213 | A | * | 11/1964 | Patten ........................... 119/497 |
| 3,310,034 | A | * | 3/1967 | Dishart ................... B60R 22/10 119/771 |
| 3,481,311 | A | * | 12/1969 | Schluttig ........................ 119/497 |
| 3,509,855 | A | * | 5/1970 | Priddy, Jr. ..................... 119/497 |
| 3,662,712 | A | * | 5/1972 | Singer ........................... 119/453 |
| 3,797,462 | A | * | 3/1974 | Davis ............................. 119/771 |
| 3,799,608 | A | * | 3/1974 | Smutny et al. ........... 297/184.14 |
| 4,010,880 | A | * | 3/1977 | Guillot-Munoz ............. 224/275 |
| D245,716 | S | * | 9/1977 | Russo ........................... D12/416 |
| 4,397,398 | A | * | 8/1983 | Watanabe ......................... 220/7 |
| 4,512,286 | A | * | 4/1985 | Rux ..................... A01K 1/0272 119/771 |
| 4,556,391 | A | * | 12/1985 | Tardivel et al. ................... 446/7 |
| 4,583,779 | A | * | 4/1986 | Myers ...................... 297/184.13 |
| 4,597,359 | A | * | 7/1986 | Moorman ............ A01K 1/0263 119/28.5 |
| 4,886,084 | A | * | 12/1989 | Lawrence et al. ............. 135/124 |
| 4,896,630 | A | * | 1/1990 | Luce .................... A01K 27/002 119/771 |
| 4,907,541 | A | * | 3/1990 | Thompson ........... A01K 1/0263 119/771 |
| 4,924,814 | A | * | 5/1990 | Beaudet ........................ 119/712 |
| 5,005,526 | A | * | 4/1991 | Parker .................. A01K 1/0272 119/751 |
| 5,123,377 | A | * | 6/1992 | Edwards .............. A01K 1/0272 119/28.5 |
| 5,277,148 | A | * | 1/1994 | Rossignol et al. ............. 119/453 |
| 5,467,734 | A | * | 11/1995 | Ho ................................. 119/497 |
| 5,479,892 | A | * | 1/1996 | Edwards .............. A01K 1/0272 119/771 |
| 5,685,258 | A | * | 11/1997 | Fricano ................ A01K 1/0272 119/28.5 |
| 5,720,312 | A | * | 2/1998 | Scheuermann ............ 135/88.09 |

(Continued)

*Primary Examiner* — Kristen C Hayes
*Assistant Examiner* — Morgan T Barlow (57) ABSTRACT

A universal, robust, cost effective, portable kennel and pet safety enclosure for use in vehicles which distributes deceleration forces across as large an area of the pet's body as possible and gently arrests the forward motion of a pet to protect them from bodily harm in the event of a sudden vehicle deceleration event and which may also be used outside of vehicles as a portable kennel. The enclosure also protects the vehicle interior from smells, stains, or scratching caused by a pet.

1 Claim, 9 Drawing Sheets

(56) References Cited

U.S. PATENT DOCUMENTS

| | | | | |
|---|---|---|---|---|
| 5,794,571 A * | 8/1998 | Goldberg | A01K 1/0263 119/771 |
| 5,915,335 A * | 6/1999 | Holt, Jr. | A01K 1/0263 119/770 |
| 5,941,195 A * | 8/1999 | Martz | 119/497 |
| 6,076,485 A * | 6/2000 | Peeples et al. | 119/497 |
| 6,079,370 A * | 6/2000 | Al-Birmani | A01K 1/0272 119/771 |
| 6,244,286 B1 * | 6/2001 | Russo | 135/128 |
| 6,253,713 B1 * | 7/2001 | Giedeman, III | A01K 1/0263 119/771 |
| 6,402,220 B2 * | 6/2002 | Allen | 296/77.1 |
| D461,966 S * | 8/2002 | Reece | D30/118 |
| 6,427,635 B1 * | 8/2002 | Ballard | A01K 1/0263 119/771 |
| 6,591,787 B1 * | 7/2003 | Gantz | A01K 1/0272 119/771 |
| 6,637,377 B2 * | 10/2003 | Lobanoff | A01K 1/0263 119/770 |
| 6,827,044 B2 * | 12/2004 | Lobanoff | A01K 1/0263 119/771 |
| 7,261,060 B1 * | 8/2007 | Garofola et al. | 119/496 |
| 7,624,705 B2 * | 12/2009 | Plante | 119/474 |
| D649,719 S * | 11/2011 | Siklosi et al. | D30/109 |
| 8,104,429 B2 * | 1/2012 | Bennett | A01K 1/0272 119/28.5 |
| 2003/0106577 A1 * | 6/2003 | Martinez | 135/125 |
| 2003/0111102 A1 * | 6/2003 | Henley et al. | 135/125 |
| 2004/0050410 A1 * | 3/2004 | DeLong | 135/88.13 |
| 2005/0284403 A1 * | 12/2005 | Delino | 119/497 |
| 2005/0284404 A1 * | 12/2005 | Pomakoy-Poole et al. | 119/497 |
| 2006/0037553 A1 * | 2/2006 | Miller et al. | 119/497 |
| 2006/0278173 A1 * | 12/2006 | Kamijo | 119/496 |
| 2009/0066071 A1 * | 3/2009 | Singh | 280/801.1 |
| 2009/0126638 A1 * | 5/2009 | Bennett | 119/28.5 |
| 2009/0314219 A1 * | 12/2009 | Bryson | 119/496 |
| 2010/0139573 A1 * | 6/2010 | Wilson et al. | 119/496 |
| 2010/0288204 A1 * | 11/2010 | Costello et al. | 119/453 |
| 2010/0313824 A1 * | 12/2010 | Northrop et al. | 119/496 |
| 2011/0197823 A1 * | 8/2011 | Pietra | 119/497 |
| 2011/0308476 A1 * | 12/2011 | Chang | 119/497 |
| 2013/0125827 A1 * | 5/2013 | Pietra | 119/496 |
| 2013/0239902 A1 * | 9/2013 | Venne | 119/453 |

* cited by examiner

VEHICLE PET SAFETY ENCLOSURE AND PORTABLE KENNEL

CROSS-REFERENCE TO RELATED APPLICATIONS

This application claims priority to U.S. Provisional Patent Application Ser. No. 61/795,326 filed Oct. 15, 2012 and titled PET CAR SEAT AND PORTABLE KENNEL, the contents of which is incorporated herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD

The field of this invention is pet accessories. Specifically, the invention relates to a pet accessory which protects a pet riding in a vehicle from injury due to rapid deceleration or impact with the vehicle interior when the vehicle stops suddenly or is involved in an accident.

BACKGROUND OF THE INVENTION

Many pet owners, particularly owners of small dogs and cats, bring their pets with them when traveling in a vehicle. Most commonly the vehicle in question is an automobile or passenger car, but this discussion applies equally to any sort of vehicle including sport utility vehicles, trucks, buses, recreational vehicles, boats, aircraft, all terrain vehicles, off-road vehicles, trains, or other motor vehicles. The term 'vehicle' as used herein refers to all of these types of motor vehicles. While it is common to allow small pets to sit on the driver's lap, or to sit on an unoccupied seat of the vehicle, this is potentially quite dangerous to the animal in the event of an accident or even a sudden stop as the animal is unrestrained and can slide off of the lap or seat and collide with the vehicle interior with great force, potentially causing injury or death. Additionally, the animal can be injured or killed by a deploying airbag. The most rudimentary solution to this problem is the use of some sort of restraint for the animal, generally affixed to the animal's collar or harness, and generally fastened to the vehicle seat belt or some other secure attachment point. Another solution is the use of a pet car seat similar to a human infant car seat wherein the pet is placed or strapped into a rigid or semi rigid enclosure which is secured to the vehicle.

Previous pet safety devices have been disclosed. For example, U.S. Pat. No. 2,909,154, issued to L. E. Thomas on Oct. 20, 1959, the contents of which are incorporated herein in its entirety, discloses a tethering strap arrangement for animals riding in a vehicle.

U.S. Pat. No. 3,310,034, issued to H. S. Dishart on Mar. 21, 1967, the contents of which are incorporated herein in its entirety, discloses a safety harness and collar for pet riding in a vehicle.

U.S. Pat. No. D245,716, issued to Anthony J. Russo on Sep. 6, 1977, the contents of which are incorporated herein in its entirety, illustrates a pet safety enclosure for a domestic animal.

U.S. Pat. No. 4,512,286, issued to Paul R. Rux on Apr. 23, 1985, the contents of which are incorporated herein in its entirety, discloses a pet container for an automobile having a hinged, multi-position front wall and a pet harness connected to the container by a leash.

U.S. Pat. No. 4,597,359, issued to Maurice D. Moorman. on Jul. 1, 1986, the contents of which are incorporated herein in its entirety, discloses a vehicle safety platform for a pet having horizontal mounting arms, a resilient base, a seat belt and a safety harness.

U.S. Pat. No. 4,896,630, issued to Therese G. Luce on Jan. 30, 1990, the contents of which are incorporated herein in its entirety, discloses an animal safety seat belt comprised of upper and lower restraints, front and rear straps, and a securement strap.

U.S. Pat. No. 4,907,541, issued to Paul L. Thompson on Mar. 13, 1990, the contents of which are incorporated herein in its entirety, discloses a pet restraint in a car having a harness with an adjustable flexible belly band, and a flexible chest band joined to the belly band.

U.S. Pat. No. 5,005,526, issued to Charles Parker on Apr. 9, 1991, the contents of which are incorporated herein in its entirety, discloses a collapsible vehicle safety apparatus for animals having a rigid base with a collapsible support frame and a pliable barrier cover attached to the base and held by restraining members.

U.S. Pat. No. 5,123,377, issued to Myrtis C. Edwards on Jun. 23, 1992, the contents of which are incorporated herein in its entirety, discloses a collapsible vehicle safety restraint and seat for pets that includes a padded seat pivotally extended from generally vertically disposed seat back which is removably affixed to an otherwise conventional vehicle.

U.S. Pat. No. 5,479,892, issued to Myrtis C. Edwards on Jan. 2, 1996, the contents of which are incorporated herein in its entirety, discloses a vehicle safety seat for pets having a pet seating portion removably disposed within base portion, with a vehicle safety seat secured to a vehicle passenger seat by securing the vehicle's seat belt portion through the vehicle seat belt passage of base portion.

U.S. Pat. No. 5,685,258, issued to Phillip Fricano on Nov. 11, 1997, the contents of which are incorporated herein in its entirety, discloses a pet safety enclosure for animals especially dogs comprised of a horizontal seat with a backrest; seat has housing with recess for seat.

U.S. Pat. No. 5,794,571, issued to Carl L. Goldberg on Aug. 18, 1998, the contents of which are incorporated herein in its entirety, discloses a vehicular safety restraint for pets having two joined, closed loops with a breast strap set on the front loop and a tether on the rear loop which is passed through a connecting strap attached to the first loop.

U.S. Pat. No. 5,915,335, issued to Robert C. Holt, Jr. on Jun. 29, 1999, the contents of which are incorporated herein in its entirety, discloses a harness for a dog in an automobile.

U.S. Pat. No. 6,079,370, issued to Maad Al-Birmani and Yousef N. Al-Humidi on Jun. 27, 2000, the contents of which are incorporated herein in its entirety, discloses a pet safety enclosure for transporting a pet having a net which is separable from and connectable to opposing sides of a back portion and has a predetermined length extending from the sides of the back portion.

U.S. Pat. No. 6,253,713, issued to Louis Albert, Giedeman, 111, David James Hoffman, Irmina V. Reyes-Helfrich, Jeffery Kim and Gary Wight on Jul. 3, 2001, the contents of which are incorporated herein in its entirety, discloses a pet restraint system for motor vehicles.

U.S. Pat. No. 6,427,635, issued to Tammy Ballard on Aug. 6, 2002, the contents of which are incorporated herein in its entirety, discloses a vehicle safety restraint for canines comprised of an upper restraint, a lower restraint, a neck strap and a harness strap.

U.S. Pat. No. D461,966, issued to Houstene Reece on Aug. 27, 2002, the contents of which are incorporated herein in its entirety, illustrates an animal automobile seat.

U.S. Pat. No. 6,591,787, issued to James Gantz and Bette A. Gantz on Jul. 15, 2003, the contents of which are incorporated herein in its entirety, discloses a pet console seat for use in connection with automobiles comprised of a bar having a middle, and a seat frame having opposing ends with one end attached to the bar.

U.S. Pat. No. 6,637,377, issued to Mark Lobanoff and Ronald S. Gulette on Oct. 28, 2003, the contents of which are incorporated herein in its entirety, discloses an animal restraint system for a vehicle having a removable, spherically-shaped vest secured to the seat belt of the vehicle via a tether strap, with leg holes for the front legs of an animal.

U.S. Pat. No. 6,827,044, issued to Mark Lobanoff and Ronald S. Gulette on Dec. 7, 2004, the contents of which are incorporated herein in its entirety, discloses an animal restraint system for a vehicle having a top strap extending across the back of an animal wearing the vest from the first to second sides of a vest jacket when the jacket is on the animal to secure the vest to the animal.

U.S. Pat. No. 8,104,429, issued to Gary Ray Bennett on Jan. 31, 2012, the contents of which are incorporated herein in its entirety, discloses an animal restraint system for a vehicle having a top strap extending across the back of an animal wearing the vest from the first to second sides of a vest jacket when the jacket is on the animal to secure the vest to the animal.

One area of deficiency generally present in all of these proposed solutions is the risk of spine, neck or choking injuries to the animal when restrained by a collar around their neck during a high energy impact or deceleration.

Another area of deficiency generally present in all of these proposed solutions is the inability of the animal to move about freely while in the vehicle.

Another area of deficiency generally present in these proposed solutions is the lack of protection for the vehicle seats from pet fur, odors, urine, excrement, scratching, or staining.

Yet another area of deficiency generally present in the proposed solutions is the inability to utilize the restraint means outside of the vehicle.

Yet another area of deficiency generally present in the proposed solutions is the absence of any provision for easily carrying, transporting, or stowing the apparatus.

While there are presently a number of proposed solutions to the problem of providing a safe means for pets to travel in vehicles, none has been conceived or implemented to permit a safe, comfortable, protective, easily cleaned, stowed, and transported solution which would be optimal for the application.

SUMMARY

Pet enclosures embodying the principles of this invention solve the problems of safe, comfortable, protective, easily cleaned, stowed, and transported pet containment and sudden deceleration protection means for use in vehicles and as a portable kennel. The several embodiments of the invention employ designs, materials, and manufacturing methods which are inexpensive and consistent with current manufacturing practices. The functionality, size, cost, simplicity, reliability and robustness of the proposed designs are all advantageous.

Implementations following the principles of this invention allow the advantageous modality of safe, comfortable, protective, easily cleaned, stowed, and transported pet containment and sudden deceleration protection means which would be optimal for the application.

This summary is intended to introduce the inventive concepts, principles and embodiments, not to define them

DETAILED DESCRIPTION

In conjunction with the included drawings, this detailed description is intended to impart an understanding of the teachings herein and not to define their metes and bounds. It will be apparent to one skilled in the art that each of these specific details need not be employed to practice the invention. In other instances, well known materials or methods have not been described in detail in order to avoid unnecessarily obscuring the invention. One particular implementation, illustrating aspects of the present teaching, is presented in detail below. Some of the many possible variations and versions are also described.

Figure 1:
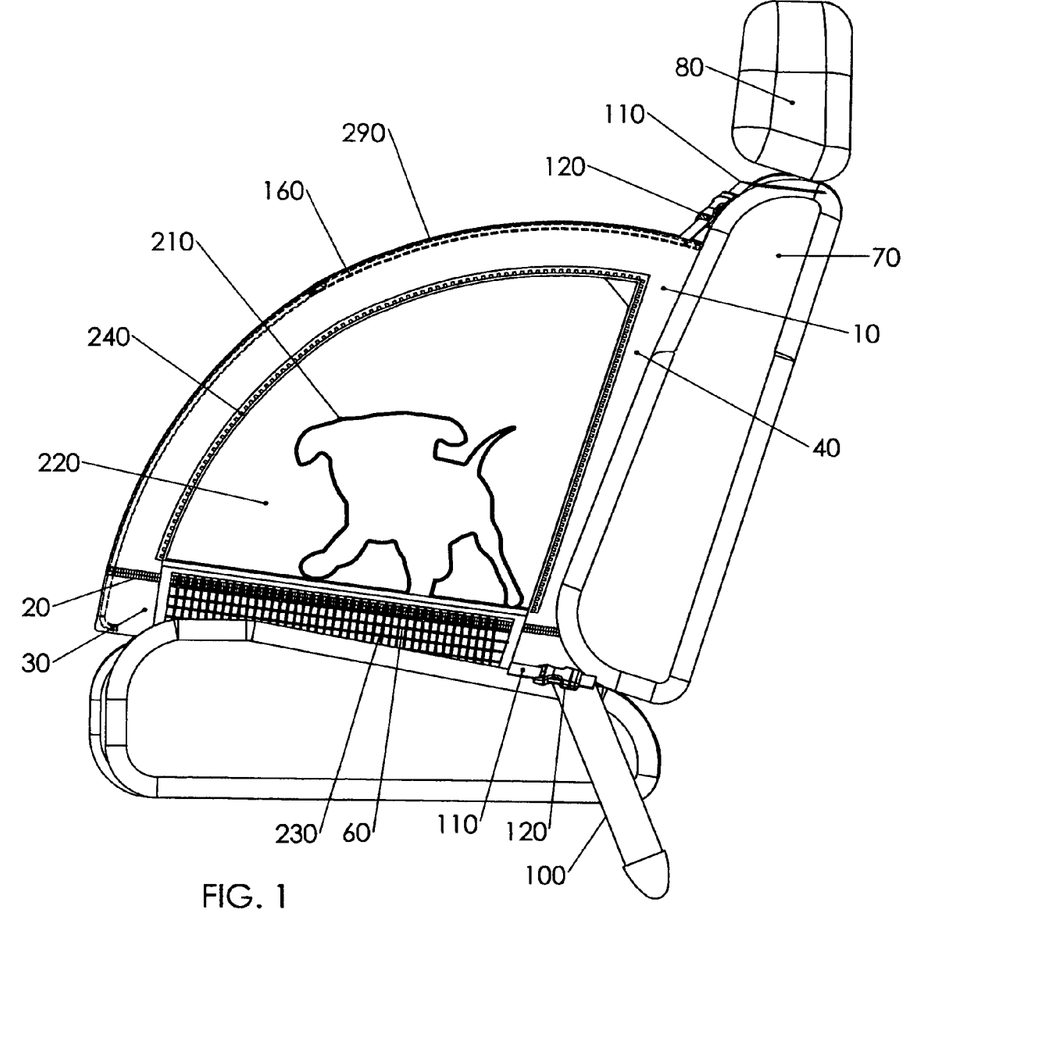
FIG. 1 shows a perspective view of the preferred embodiment of a pet safety enclosure and portable kennel embodying teachings of the present disclosure.

FIG. 1 illustrates a perspective view of the preferred embodiment of the present invention in use wherein major components are clearly visible. In this view, the generally rectilinear plan of the device is visible, with a curved front face. Dog 210 may be seen to be situated within the portable kennel pet safety enclosure 10, visible through entryway 220 as entry flap zipper 240 is unzipped, permitting entry flap 230 to be opened.

FIG. 1 also illustrates how portable kennel pet safety enclosure 10 rests upon vehicle seat 70 which provides load bearing support for the base of the unit including foam cushion 30.

Figure 6:
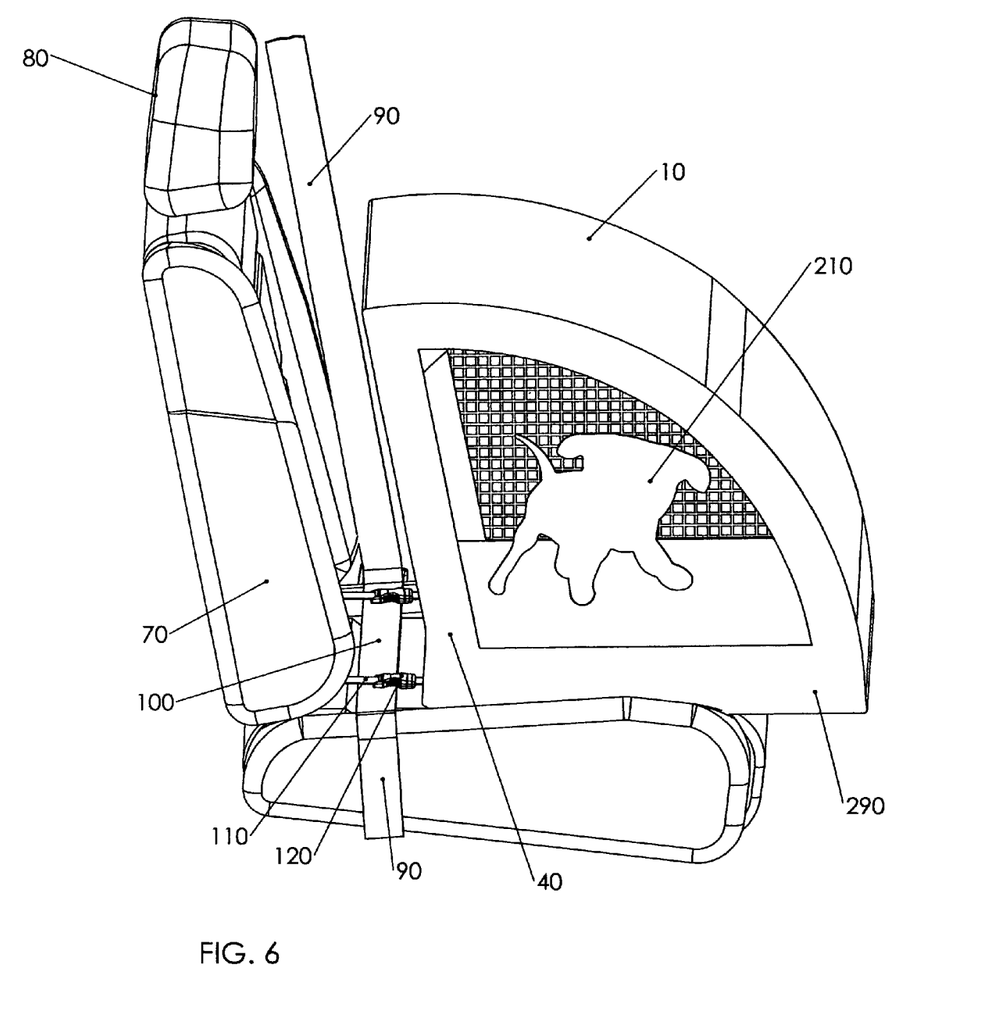
FIG. 6 shows a side view of the preferred embodiment of a pet safety enclosure and portable kennel embodying teachings of the present disclosure attached to a vehicle seat belt.

FIG. 6 illustrates how the upper portion of portable kennel pet safety enclosure 10 is secured to the vehicle by means of quick release buckle 120 on reinforced webbing 110 which loops around vehicle headrest 80 or vehicle seat back, and the lower portion by means of quick release buckle 120 on reinforced webbing 110 attaches either to the vehicle seatbelt 90 or the vehicle seat back proximal to the seat base, by looping around the seat back, since these various anchor points are accessible, robust, and intended to secure the considerably larger loads of a human being subjected to sudden decelerative forces.

Referring once again to FIG. 1 it may be seen that the curved front surface the fabric shell 290 is secured at the upper end to vehicle headrest 80 by means of quick release buckle 120 which is attached to reinforced webbing 110. Reinforced webbing 110 is robustly stitched or riveted or by some other means mechanically fastened to fabric shell 290 including the curved top/front face of fabric shell 290 which constitutes the front/top of portable kennel pet safety enclosure 10, with the distal end of the formed surface secured by means of reinforced webbing 110 and quick release buckles 120 to vehicle lap belt 100. In this manner, a robust, securely anchored, continuous curved surface of material roughly approximating a parabola forms the top and front of the device which has the advantageous function of catching and gently arresting the forward motion of the dog 210 located within the portable kennel pet safety enclosure 10 in the event that dog 210 is hurled forwards as a result of a sudden vehicle deceleration as would result from a panic or sudden stop or a front end accident. This gentle, full body cradling of dog 210 is a superior means of arresting high acceleration forward motion and preventing potentially dangerous or fatal collisions with other components of the car including the dashboard, windshield, instrument panel, foot well or other hard or sharp surfaces, as well as avoiding injury from a deploying airbag. This full body cradling eliminates the risk of neck injuries inherent with the use of tethers or restraints which secure the dog 210 to the vehicle or seatbelt by means of anchoring to the dog's collar or harness, wherein the full inertia and kinetic energy of the dog's body being accelerated forward due to a sudden vehicle deceleration would be transferred to the dog's neck and or spine if the collar or harness suddenly reached the end of its inelastic tether's travel limits. The curved front face of fabric shell 290 distributes decelerative loads more evenly across the entirety of the pet's body during a sudden deceleration event, thereby lessening the force to which any one part of the pet's body is subjected.

Figure 1A:
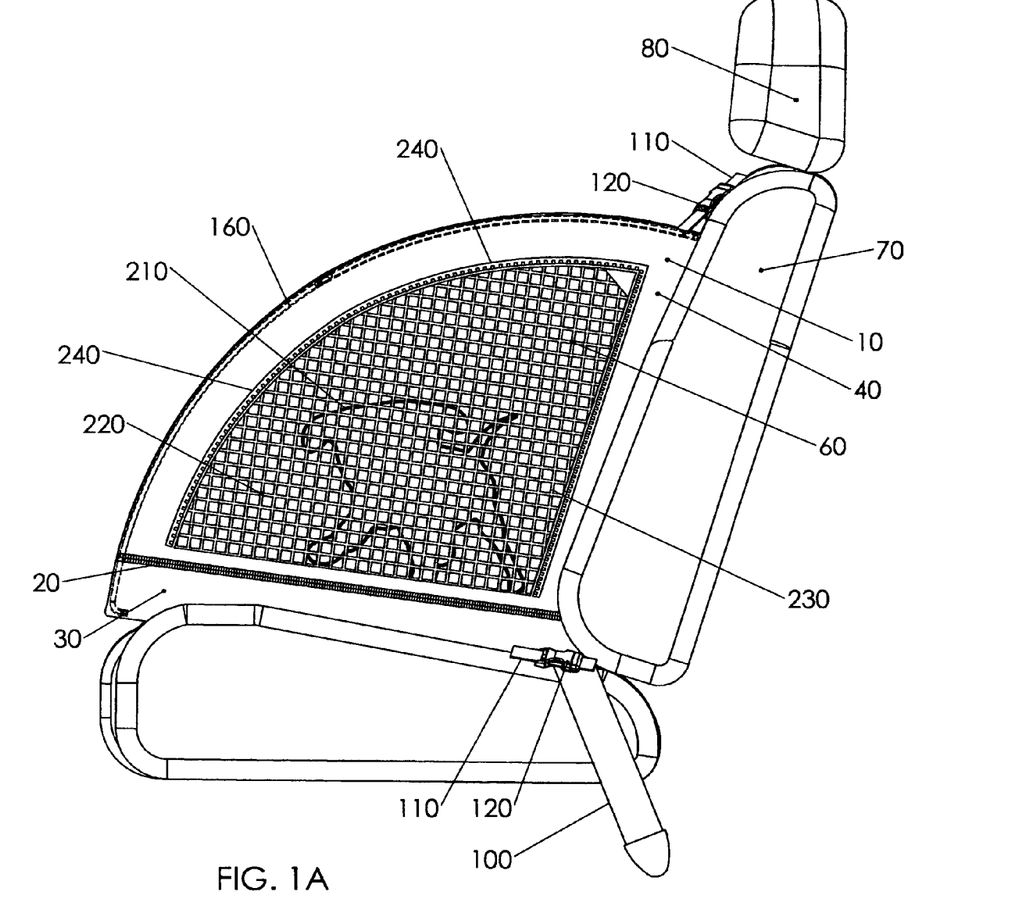
FIG. 1a shows a perspective view of the preferred embodiment of a pet safety enclosure and portable kennel embodying teachings of the present disclosure with the entry door closed.

Referring now to FIG. 1a one may more plainly see how entry 220 is now fully closed by entry flap 230 which is secured by entry flap zippers 240. Entry flap 230 is typical of an egress means which may be incorporated on one or both sides of the enclosure. Entry flap 230 may be fully or partially opened. When partially opened, the use of locking zippers 240 or the used of hook and loop fastener or a button or snap or some other fastening means which permits incremental closure provides for access to the interior of portable kennel pet safety enclosure 10 while preventing dog 210 from being able to exit.

Figure 2:
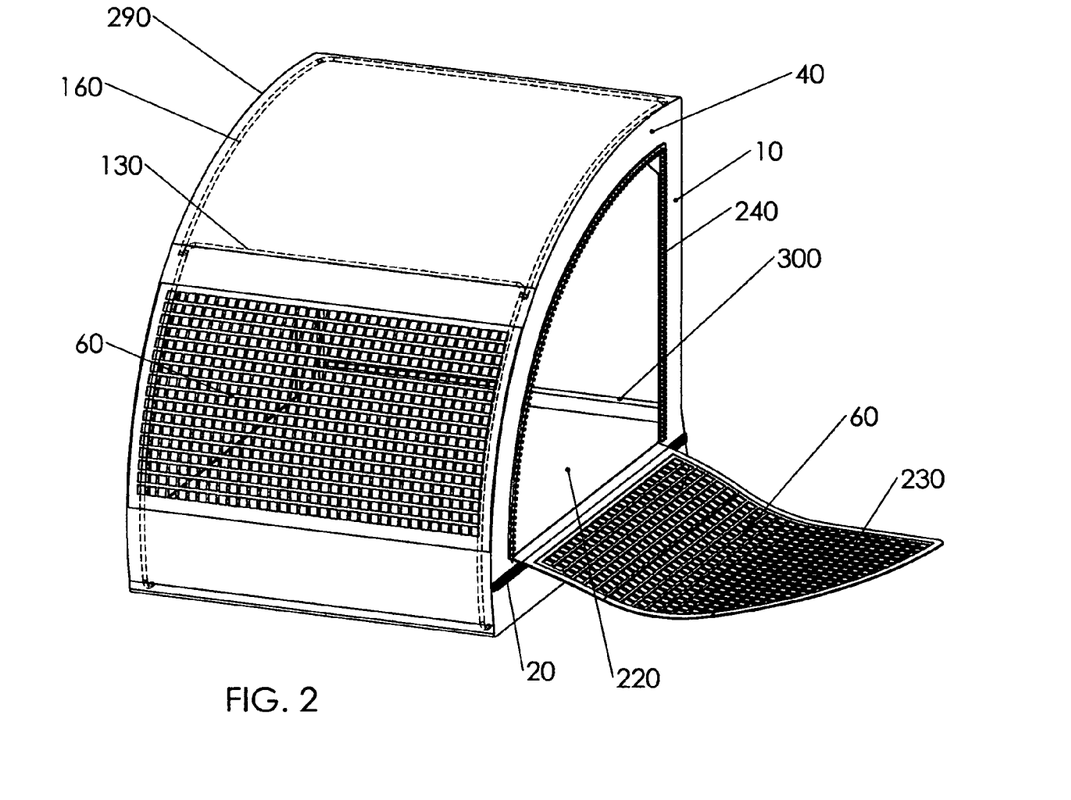
FIG. 2 shows a perspective view of the preferred embodiment of a pet safety enclosure and portable kennel embodying teachings of the present disclosure in the open or erect condition.

Referring now to FIG. 2, the general shape, structure, and function of the device may be more plainly understood. In this view, it is clearly visible how fabric shell 290 is given form by the collapsing frame 300 resident within the unit. Transverse member 130 may be plainly seen through the mesh cloth 60 to be supporting and defining the shape of the curved front fabric of the unit as it is secured to other stationary and pivoting members of collapsing frame 300.

Figure 3:
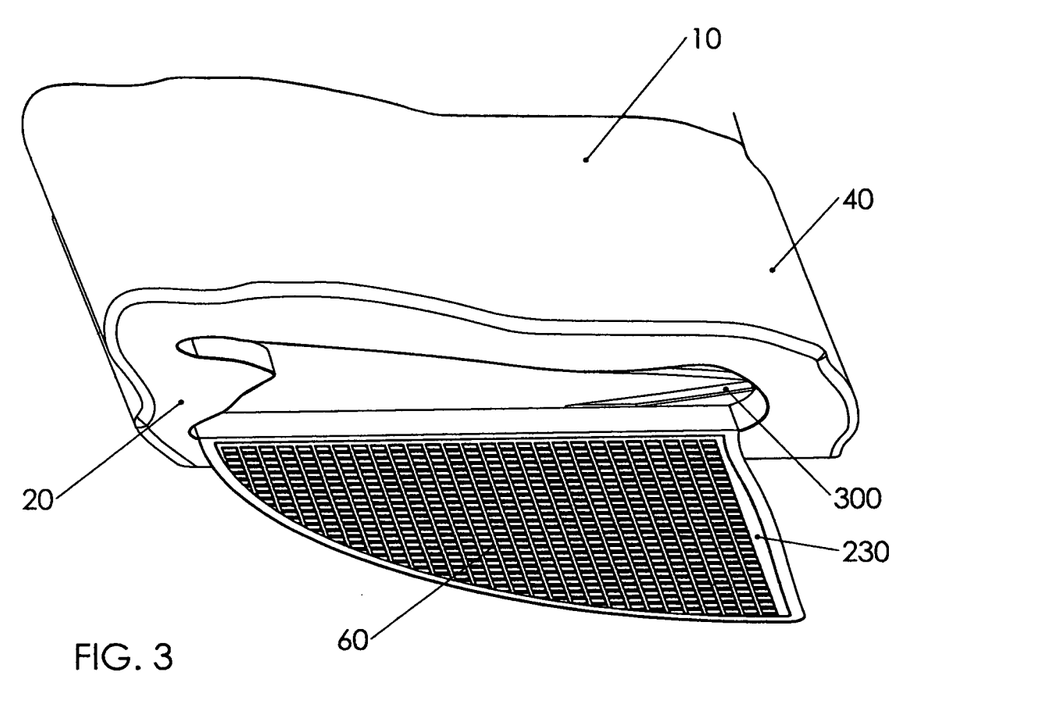
FIG. 3 shows a perspective view of the preferred embodiment of a pet safety enclosure and portable kennel embodying teachings of the present disclosure in the closed or folded condition.

FIG. 3 illustrates portable kennel pet safety enclosure 10 in the collapsed, stowed, or folded mode. In this configuration, collapsing frame 300 has been folded, causing fabric shell 290 to collapse into the minimum possible volume. This permits easy transport or stowage of the unit. It should also be noted that collapsing frame 300 is so designed as to permit this collapse and erection without the necessity of tools or latches or removing any parts.

Figure 4:
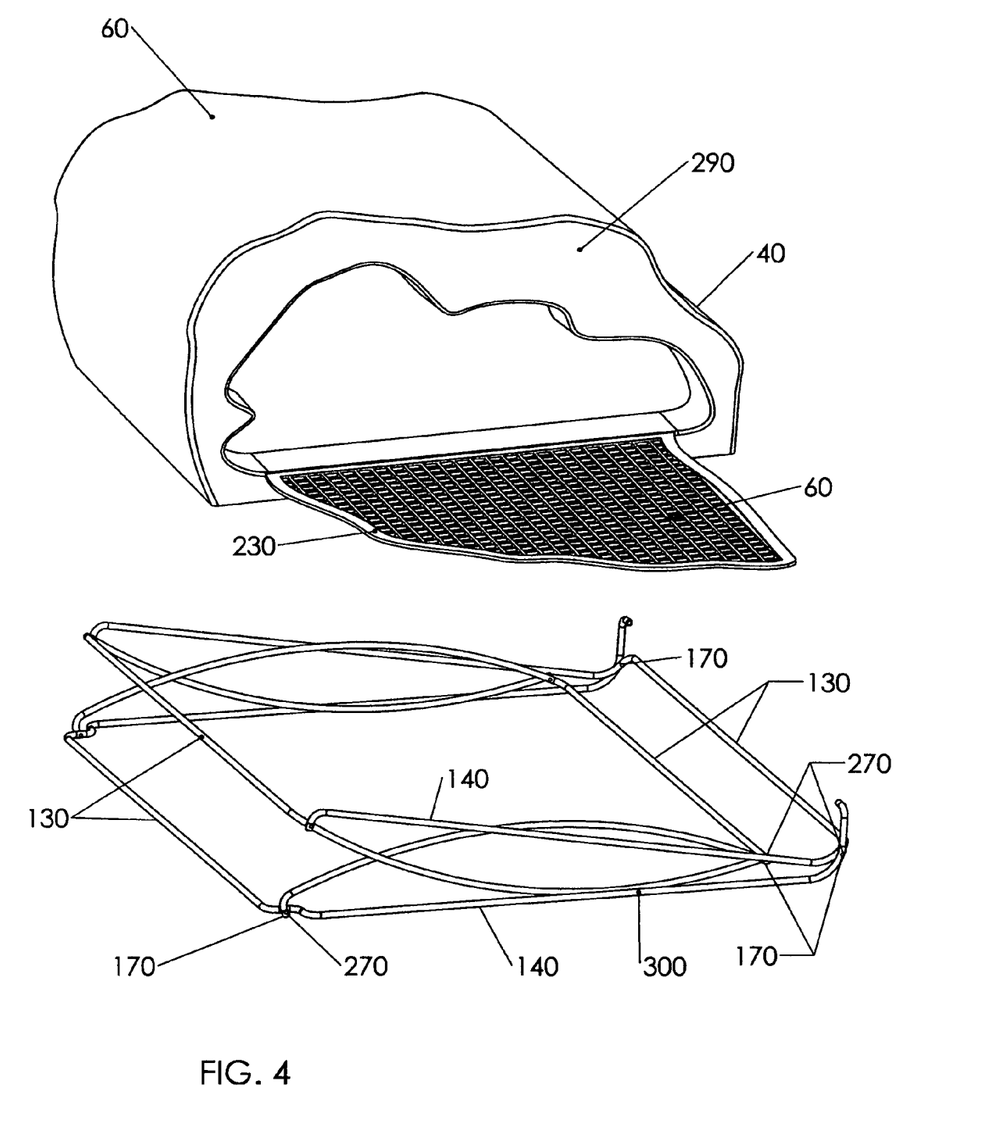
FIG. 4 shows a perspective view of the preferred embodiment of a pet safety enclosure and portable kennel embodying teachings of the present disclosure wherein the internal frame has been removed from the enclosure envelope.

Referring now to FIG. 4, collapsing frame assembly 300 has been removed from fabric shell 290 both to more clearly illustrate its form and components and to indicate how collapsing frame assembly 300 may be easily removed from fabric shell 290 without the use of tools or fasteners and without requiring disassembly of frame assembly 300 or fabric shell 290 to permit cleaning or machine washing of fabric shell 290.

Figure 5:
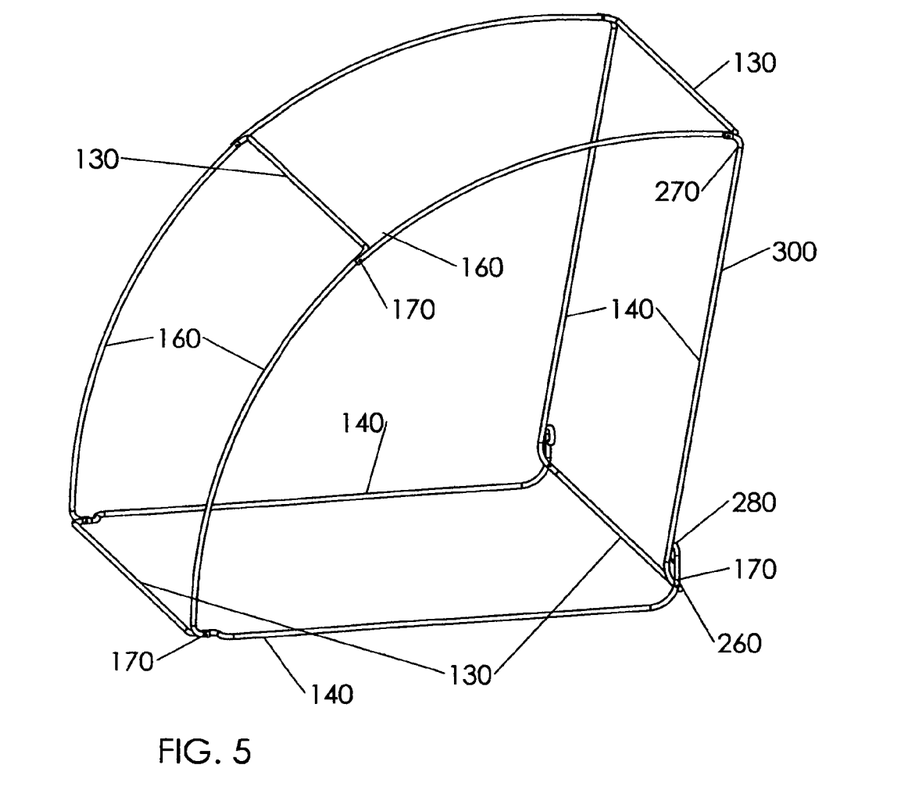
FIG. 5 shows a perspective view of the preferred embodiment of a pet safety enclosure and portable kennel embodying teachings of the present disclosure with the internal frame in the open or erect condition.

FIG. 5 illustrates collapsing frame assembly 300 in the open or erected mode. In this view, the various components which comprise collapsing frame assembly 300 may be more plainly seen and their functions understood. Transverse members 130 are structural frame elements which serve both to define the width of the unit and to support the vertices and tangent points of fabric shell 290 when deployed in the open position. These transverse members can be made of any of a variety of materials including wire forms, metal rod stock, profile extrusions of plastic or metal, tubing or pipe of plastic or metal, wood, or any such other material and manufacturing method as will result in a rigid rod-like member. The frame members may be comprised of an assembly of separate cross members and support rods, or may be comprised of an assembly of integrated structures such as in the preferred embodiment a wire form, which combine the function of cross member and support rod in one assembly. In the preferred embodiment, the frame assembly 300 is comprised of 4 wire-form components pivotably attached in order to advantageously permit erection and collapsible folding of the assembly.

Figure 8:
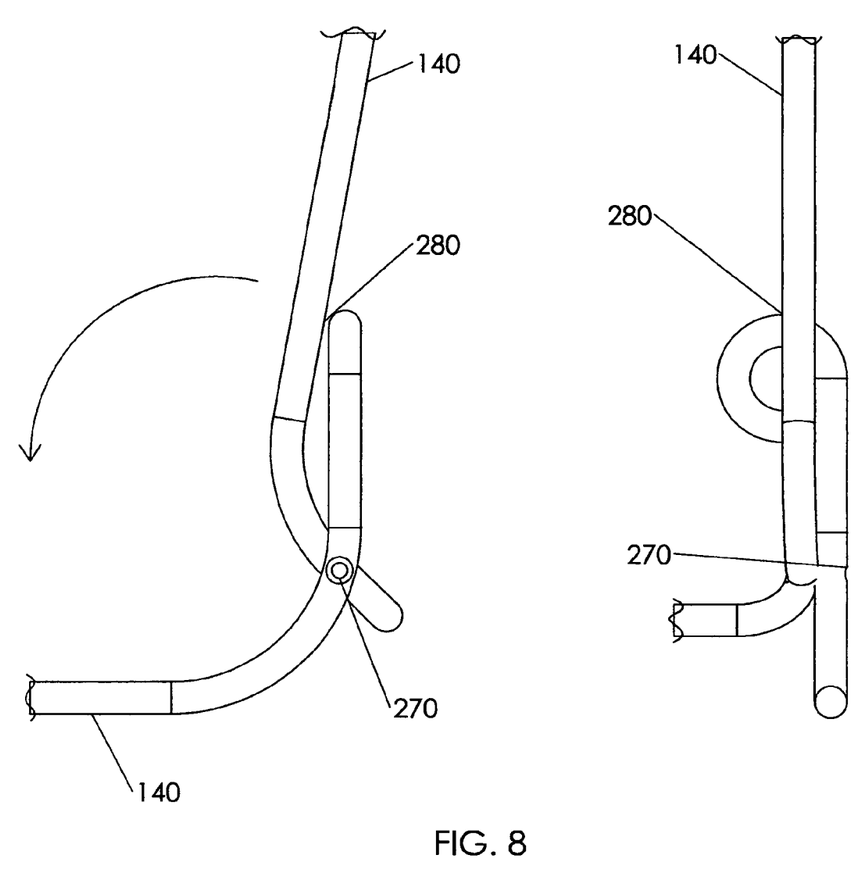
FIG. 8 shows a side and front schematic view of the preferred embodiment of a travel limited hinge assembly embodying teachings of the present disclosure.

Still referring to FIG. 5, rigid rods 140 may be seen to comprise the vertical and horizontal frame members which define the edges of the fabric shell 290 in the erected position. Rigid rods 140 are secured axially and rotatably affixed to transverse members 130 by means of hinge points 170 so as to permit the folding action necessary to collapse or erect the collapsing frame assembly 300. Hinge points 170 may be of a conventional design comprising hinge plates and hinge pins or as in the preferred embodiment, rivets which serve the purpose of assembling frame components to one another while permitting relative motion there between. Hinge assembly 260 has a travel limit 280 which permits the vertical rigid rod 140 to rotate beyond the 90 degree vertical limit to form an obtuse angle with horizontal rigid rod 140, but prevents it from traveling beyond this point. This is illustrated in greater detail in FIG. 8 where A-A indicates the interference created by means of travel limit 280 against the relative motion of the corresponding member of hinge assembly 260 so as to permit the hinge to fold fully into the collapsed position but to limit the rotation in the opposite direction, towards the open condition, to an obtuse angle somewhat greater than 90 degrees, this obtuse angle permitting the erected unit to conform to the included angle between seat base and seat back in a typical vehicle. In the preferred embodiment, travel limit 280 is comprised of a travel stop formed of and integral to the wire form component comprising the frame base.

Still referring to FIG. 5, curved rods 160 which may be formed of fiberglass, plastic, wood, or any other material which permits flexibility, or alternately may be formed of rigid materials which have been pre-formed with the arc of a specified radius to create the front profile of the unit, may be seen to comprise at least 2 members on each side, pivotably joined mid-span to permit them to fold rotatably about one another, thereby permitting the collapsing frame assembly 300 to fold compactly. In the preferred embodiment of the invention, curved rods 160 are integrally formed with the wire form assemblies comprising upper and lower curved rods and top, bottom, and mid-span transverse members. Because the distance from the pivot point at the front lower corner of the unit to the mid-span pivot of curved rod 160 plus the distance from the mid-span pivot of curved rod 160 to the upper pivot point is greater than the hypotenuse of the right triangle formed by the horizontal and vertical rigid rods 140, the hypotenuse formed by the hinged curved rods 160 creates an 'over-center' hinge effect wherein once it has been 'popped' over-center into the erected position, it robustly resists collapsing back into the folded position—thereby bestowing a structural rigidity to the unit. This 'over-center' effect is also what permits the collapsing frame assembly 300 to exist as a completely independent assembly which is not attached or secured in any way to fabric shell 290, but instead may be easily slipped into or removed from fabric shell 290 when collapsed, and when erected, completely expands and stretches fabric shell 290 into the erect state and is thereby self-supporting.

FIG. 6 illustrates the lower rear section of portable kennel pet safety enclosure 10 as installed in a vehicle, wherein quick release buckles 120 on reinforced webbing 110 which is secured to fabric 40 of fabric shell 290 encircle and entrap lap belt 100 of seat belt 90 in order to secure portable kennel pet safety enclosure 10 in position on vehicle seat 70—thereby forming the lower anchor point of the earlier referenced curved fabric face which restrains dog 210 in the event of a sudden deceleration event.

Referring now to FIG. 1, cushion zipper 20 may be seen which allows the user to unzip the lower portion of fabric shell 290 to remove foam cushion 30 in order to remove the cushion to facilitate washing of the cushion or fabric shell or to replace the cushion.

Figure 7:
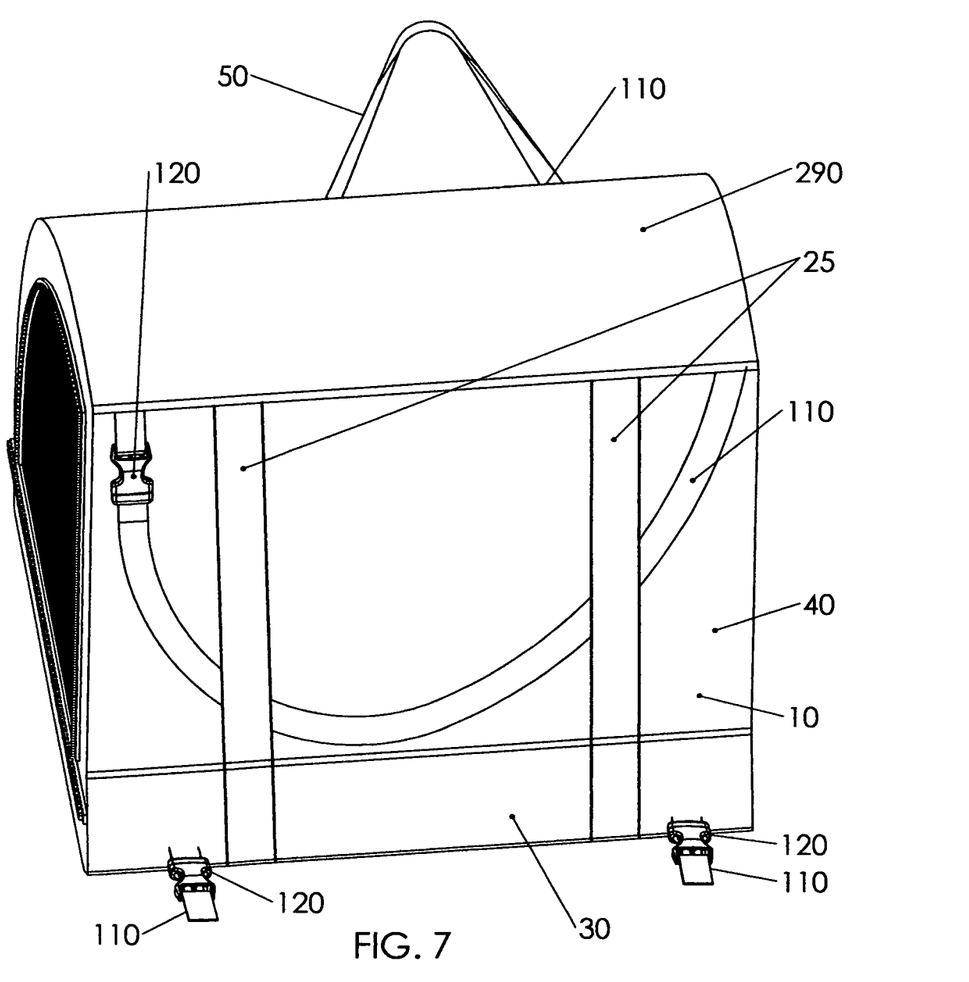
FIG. 7 shows a rear view of the preferred embodiment of a pet pet safety enclosure and portable kennel embodying teachings of the present disclosure.

FIG. 7 illustrates the back of the preferred embodiment of the invention wherein carrying handle 50 is in use to lift the unit, and may be seen to offer a convenient means of transporting the unit in both the deployed and stowed configurations. In another embodiment, a corresponding carrying handle 50 is attached to the front of the bottom edge of fabric shell 290 such that when the unit is collapsed, the handles are aligned and proximal to one another and a user may grasp both handles concurrently, facilitating lifting and carrying the folded assembly and preventing accidental unfolding. Back pack straps 250 may also be attached on this back panel to provide yet another convenient transport option. A strap, clip, buckle, hook or other fastening means may also be offered to keep the unit in the stowed or collapsed position to facilitate transport without the unit tending to erect independently.

Operation of this embodiment of the invention is as follows. Collapsible frame assembly 300 in the collapsed state is inserted into fabric shell 290 by means of entry 220. Collapsible frame 300 is erected by rotatably displacing curved rods 160 until they pop 'over-center' thereby fully expanding collapsible frame 300 and fully extending fabric shell 290. Dog 210 may be introduced into the unit through entry 220 which may be closed and secured if desired by zipping entry flap zipper 240 to close entry flap 230. The unit is secured to vehicle seat 70 by means of reinforced webbing straps 110 and quick release buckles 120 which are secured to headrest 80 and lap belt 100. With dog 210 inside the unit, the vehicle seats and upholstery are protected from wear, staining, odors, or messes which the dog might cause. The dog 210 is now safely ensconced in the unit and in the event of a sudden deceleration, rather than striking the dashboard, windshield, foot-well, or other hard or sharp surface inside the vehicle, its forward motion is safely arrested by the curved front surface of the unit which is anchored by the lap belt 100 and headrest 80. Upon arrival at the travel destination, or home, the portable kennel pet safety enclosure 10 may be removed from the vehicle by releasing quick release buckles 120 from the headrest 80 and lap belt 100 and carrying the unit to a location outside of the vehicle, whether indoors or out, where it can serve as a portable kennel. Alternately, the unit may be collapsed and stowed in the vehicle trunk or in the home. In the event that the unit gets dirty, it may be machine washed after removing collapsible frame 300 and foam cushion 30.

It may be seen in this embodiment of the invention that the invention overcomes the deficiencies of all previous attempts at solving the problem of safely transporting pets in motor vehicles, and providing an easily transported portable kennel for pets at home or travel destinations in a unit which is washable, easy to use, safe, robust, inexpensive, and readily manufacturable using industry standard materials, methods, and practices.

Variations

There are many possible variations of the implementations described above consistent with the teaching of the present disclosure. Variations include different sizes, shapes, colors, textures, and material for the enclosure which may be fabric, plastic, rubber, or other materials including rigid materials, and different erected shapes including angular or faceted front surfaces rather than curved front surfaces, as well as different structural designs and materials for the collapsing frame including external frames wherein structural members reside external to the fabric enclosure and the enclosure is secured to the frame by means of hooks, clips, straps or other attaching means; or an integrated frame wherein frame members are contained within sleeves, pockets or fully enveloped within the fabric enclosure. Variations may also include alternate means of securing the unit to the vehicle in addition to or instead of the seat belt and headrest. Variations may also include rigid bottom shells and/or back shells which permit the unit to be folded into a hard shell transport case for stowage; or the inclusion of pockets or other storage/stowage means to carry food, water, clothing, waste bags, leash, or other pet items as required; or a water/food bowl or serving means may be integrated into the inside of the unit. Straps may be included which permit the unit to be carried like a backpack for easy transportation; and wheels may be included which permit the unit to roll. Various waterproof or impermeable materials may be used to construct the entire shell of the enclosure or for a barrier layer between the interior of the base and the foam cushion to prevent the foam and the vehicle seat from getting saturated by liquids inside the enclosure. Variations may also include a bottom cushion which is separate from the fabric enclosure and therefore easily removed for cleaning or washing, or to permit turning over to present a clean surface in the event of a spill or mess occurring on the top surface of the cushion.

In broad embodiment, the present invention is a universal, robust, cost effective, portable kennel and pet safety enclosure for use in vehicles which gently decelerates a pet to protect them from bodily harm in the event of a sudden vehicle deceleration event and which may also be used outside of vehicles as a portable kennel.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A pet safety enclosure comprising:
   an outer fabric shell; and
   a free-standing internal collapsible frame;
   wherein the outer fabric shell comprises at least one entry, each entry accessible via a fastening means;
   wherein the internal collapsible frame comprises two sides, each side being made of at least four rigid rods rotatably secured to one another via hinges, the two sides connected via at least three transverse rods not rotatably affixed to each side;
   wherein the internal collapsible frame is capable of being inserted and removed from the outer fabric shell without the use of tools;
   wherein, in use, the enclosure has a nearly parabolic curved front surface capable of catching an animal in the event of quick deceleration, in order to arrest high forward acceleration and avoid bodily injury;
   wherein, at a midpoint of the parabolic curved front surface of the internal collapsible frame, the rigid rods are rotatably connected via an over-center hinge; and
   wherein, when erected, the enclosure is secured via attachment means at an upper end to a vehicle's headrest and at a distal end to a vehicle's lap belt.

* * * * *